United States Patent [19]

Ujiie

[11] Patent Number: 5,121,485
[45] Date of Patent: Jun. 9, 1992

[54] MULTI-SYSTEM BUS CONNECTED VIA INTERFACE SIDE BUFFERING INTERSTAGE BUFFERS, AND CPU SIDE BUFFERS TO CPU I/O BUS AND SLAVE SYSTEM

[75] Inventor: Mikio Ujiie, Tokyo, Japan

[73] Assignee: NEC Corporation, Tokyo, Japan

[21] Appl. No.: 358,111

[22] Filed: May 30, 1989

[30] Foreign Application Priority Data

May 28, 1988 [JP] Japan ................. 63-131235

[51] Int. Cl.[5] .................. G06F 13/36; G06F 13/40
[52] U.S. Cl. ........................ 395/325; 364/DIG. 2
[58] Field of Search ... 364/200 MS File, 900 MS File

[56] References Cited

U.S. PATENT DOCUMENTS

| | | | |
|---|---|---|---|
| 4,511,969 | 4/1985 | Koenig et al. | 364/200 |
| 4,833,599 | 5/1989 | Colwell et al. | 364/200 |
| 4,837,677 | 6/1989 | Burrus, Jr. et al. | 364/200 |
| 4,896,256 | 1/1990 | Roberts | 364/200 |
| 4,901,224 | 2/1990 | Ewert | 364/200 |
| 4,912,636 | 3/1990 | Margar et al. | 364/200 |

OTHER PUBLICATIONS

Intel Multibus Specification 1983, pages 2-1-2-18; 4-1-4-28; and 5-1-5-22.

Primary Examiner—Thomas C. Lee
Assistant Examiner—L. Donaghue
Attorney, Agent, or Firm—Sughrue, Mion, Zinn, Macpeak & Seas

[57] ABSTRACT

A microprocessor system includes interstage buffer circuits and a slave system. The interstage buffer circuits include data signal buffer circuits (8a, 8b) and a swap buffer circuit (9), connected in parallel with the data signal buffer circuits (8a, 8b), for performing bit width conversion. The slave system is connected to a bus for connecting an interstage control signal buffer circuit and an interface control signal buffer circuits, a bus for connecting an interstage address signal buffer circuit and an interface address signal buffer circuit, and a bus for connecting the buffer circuits (8a, 9, 8b) and an interface data signal buffer circuit.

1 Claim, 4 Drawing Sheets

MULTI-SYSTEM BUS CONNECTED VIA INTERFACE SIDE BUFFERING INTERSTAGE BUFFERS, AND CPU SIDE BUFFERS TO CPU I/O BUS AND SLAVE SYSTEM

BACKGROUND OF THE INVENTION

The present invention relates to a microprocessor system and, more particularly, to a microprocessor system for performing data transfer with another system through a multi-system bus.

A multi-system bus system is employed to arrange a system for causing a plurality of microprocessor systems to perform data transfer or a system including a slave system for passively performing data transfer under the control of another system. Known conventional multi-system buses are a 16-bit IEEE 796 bus and a 32-bit VME (Versa Module European) bus. If a system arranged by utilizing such a multi-system bus it is called a multi-system, and the multi-system has an arrangement, as shown in FIG. 2.

The multi-system shown in FIG. 2 includes three microprocessor systems 310, 320, and 330 and one slave system 340 connected to the microprocessor systems 310, 320, and 330 through a multi-system bus 300. The slave system 340 comprises a memory circuit 341 and a buffer circuit 342 and can be simultaneously accessed by the three microprocessor systems 310, 320, and 330. Each of the three microprocessor systems 310, 320, and 330 has master and slave modes. A priority is assigned to a microprocessor system set in the master mode to use or occupy the multi-system bus. A microprocessor system set in the slave mode performs a subordinate operation. More specifically, a microprocessor system set in the master mode exchanges data with a microprocessor system set in the slave mode or the slave system 340.

The three microprocessor systems 310, 320, and 330 basically comprise central processing units (CPUs) 311, 321, and 331, buffer circuits 312, 322, and 332, local systems 313, 323, and 333, buffer circuits 314, 324, and 334, and bus access control circuits 315, 325, and 335, respectively. The local systems 313, 323, and 333 include CPUs, memory circuits, and I/0 devices, and perform predetermined operations under the direct control of the CPUs 311, 321, and 331, respectively. The local systems 313, 323, and 333 output bus access request signals to the bus access control circuits 315, 325, and 335 upon reception of commands from the CPUs 311, 321, and 331 when the CPUs 311, 321, and 331 access the multi-system bus 300. A bus access control signal 301 on the multi-system bus 300 is supplied to the bus access control circuits 315, 325, and 335 to determine a master-slave relationship among the three microprocessor systems. An address signal, a data signal, and a control signal are output onto the multi-system bus 300. A timing chart of this multi-system is shown in FIG. 3.

Of the three microprocessor systems, the microprocessor system 310 has a basic arrangement. The microprocessor system 320 additionally includes a slave system comprising an I/0 device 326 and a slave buffer circuit 327. This slave system is controlled through the multi-system bus 300 in the same manner as the slave system 340 and cannot be directly controlled by the CPU 321. The microprocessor system 330 additionally includes a bidirectional control circuit 336, a memory circuit 337, a decoder 338, and a slave buffer circuit 339. The memory circuit 337 is directly controlled by the CPU 331 and can be accessed by CPUs of other systems through the multi-system bus 300. The additional components of the system 330 similarly constitute a slave system.

Microprocessor systems as an object of the present invention are those having slave systems, e.g., the microprocessor systems 320 and 330. However, a conventional microprocessor system having a slave system is arranged, as shown in FIG. 4.

Referring to FIG. 4, output and input/output buses of a CPU 20 are connected to a control signal buffer circuit 21, an address signal buffer circuit 22, and a data signal buffer circuit 23. Of multi-system buses 34, a bus access control signal bus is connected to a bus access control circuit 27; a control signal bus is connected to a control signal buffer circuit 28 and a slave control signal buffer circuit 32; an address bus is connected to an address signal buffer circuit 29 and a slave address signal buffer circuit 35; and a data bus is connected to data signal buffer circuits 30a and 30b, a swap buffer circuit 31, and a slave data signal buffer circuit 33. The control signal buffer circuits 21 and 28 are connected to each other through the control signal bus. The address signal buffer circuits 22 and 29 are connected to each other through the address bus. The data signal buffer circuits 23 and 30a are connected through the data bus as are the data signal buffer circuit 30b and the swap buffer circuit 31. These buses as local system buses 24 are connected to a local system 43. The slave control signal buffer circuit 32, the slave address signal buffer circuit 35, and the slave data signal buffer circuit 33 are connected to a slave system 44 through slave system buses 26.

The local system 43 decodes a control signal sent through the control signal bus and generates a multi-system bus access request signal 40. The multi-system bus access request signal 40 is supplied to the bus access control circuit 27 and the buffer control circuit 25. The bus access control circuit 27 determines whether the multi-system buses 34 are accessed in the master or slave mode. The bus access control circuit 27 generates a multi-system bus access enable signal 41 on the basis of the determination result. The signal 41 is supplied to the buffer control circuit 25. The buffer control circuit 25 performs input/output control of the control signal buffer circuit 28, the address signal buffer circuit 29, the data signal buffer circuits 30a and 30b, and the swap buffer circuit 31 in accordance with the content of the input multi-system bus access enable signal 41, thereby achieving data transfer through the multi-system buses 34.

Even if the multi-system bus 34 is a 16-bit IEEE796 bus, the number of bits processed by the CPU of each microprocessor system is not 16 in all systems, but is normally an arbitrary number such as eight in some systems. The microprocessor system of this type includes the swap buffer circuit 31 for performing conversion between a bit width processed by the CPU of the system and a transfer bit width of the multi-system bus 34. In this case, the swap buffer circuit 31 is directly connected to the multi-system bus 34, as shown in FIG. 4.

As is apparent from the conventional microprocessor system, as shown in FIG. 4, since the buffer circuit (multi-system bus buffer circuit) for interfacing the microprocessor system with the multi-system bus is connected in parallel with the buffer circuit (slave buffer circuit) for interfacing the slave system with the multi-system bus, the following problems occur.

The data signal buffer circuits 30a and 30b, the swap buffer circuit 31, and the slave data signal buffer circuit 33 are connected in parallel with the data bus of the multi-system buses. Since a plurality of microprocessor systems and the like are connected to the multi-system buses, an n x m (where n is the number of microprocessor systems, and m is the number of parallel-connected buffer circuits) load acts on the multi-system buffer circuit of the microprocessor system operated in the master mode. This overload causes degradation of waveform and limitations of a DC fan-out count, thereby complicating system design.

The multi-system buffer circuit and the slave buffer circuit are mounted on a single printed circuit board and are connected through wiring patterns. In this case, the number of circuits is large, the pattern lengths are undesirably increased, and pattern designing becomes cumbersome.

Since the wiring pattern length is increased, noise generated from the interior of the microprocessor system is induced on the pattern and appears on the multi-system bus, thus degrading the overall operation of the system. The microprocessor system tends to be adversely affected by noise appearing on the multi-system bus.

SUMMARY OF THE INVENTION

It is, therefore, an object of the present invention to provide a microprocessor system, wherein a load acting on a multi-system bus can be reduced, and system operation failures caused by external and internal noise components can be prevented to improve system reliability.

In order to achieve the above object of the present invention, there is provided a microprocessor system connected in parallel with a given microprocessor system to multi-system buses, comprising a slave system, directly controlled by a central processing unit and/or controlled by the given microprocessor system through the multi-system buses, for performing a subordinate operation, a bidirectional interface control signal buffer circuit, a bidirectional interface address signal buffer circuit, and a bidirectional interface data signal buffer circuit which are respectively connected to a control signal bus, an address bus, and a data bus of the multi-system buses, a CPU control signal buffer circuit connected to a CPU control signal output bus, a CPU address signal buffer circuit connected to a CPU address signal input/output bus, and a CPU data signal buffer circuit connected to a CPU data signal input/output bus, and a unidirectional interstage control signal buffer circuit connected midway along a bus arranged between the CPU control signal buffer circuit and the interface control signal buffer circuit, for connecting the CPU control signal buffer circuit to the interface control signal buffer circuit or disconnecting the CPU control signal buffer circuit from the interface control signal buffer circuit, a unidirectional interstage address signal buffer circuit, arranged midway along a bus arranged between the CPU address signal buffer circuit and the interface address signal buffer circuit, for connecting the CPU address signal buffer circuit to the interface address signal buffer circuit or disconnecting the CPU address signal buffer circuit from the interface address signal buffer circuit, and a bidirectional interstage buffer circuit, arranged midway along a bus arranged between the interface data signal buffer circuit and one of the CPU data signal input/output bus and the CPU data signal buffer circuit, for connecting the one of the CPU data signal input/output bus and the CPU data signal buffer circuit to the interface data signal buffer circuit or disconnecting the one of the CPU data signal input/output bus and the CPU data signal buffer circuit from the interface data signal buffer circuit. The interstage buffer circuits including data signal buffer circuits (8a, 8b) and a swap buffer circuit (9), connected in parallel with the data signal buffer circuits (8a, 8b), for performing bit width conversion, and the slave system being connected to a bus for connecting the interstage control signal buffer circuit and the interface control signal buffer circuit, a bus for connecting the interstage address signal buffer circuit and the interface address signal buffer circuit, and a bus for connecting the interstage buffer circuits (8a, 9, 8b) and the interface data signal buffer circuit.

When the slave system of the system of the present invention receives data transferred from a given system connected to the multi-system buses, three interstage buffer circuits share the operations. The system of the present invention is separated into a CPU side and a multi-system bus side. The slave system is connected to the multi-system buses through three interface buffer circuits and receives data transferred from the given system. When data transfer is performed from the CPU of the system of the present invention to the given system connected to the multi-system buses, the interstage three buffers perform connection/disconnection operations.

The interface buffer circuits connected to the multi-system buses are given such that the number of interface buffer circuits connected to an address, data or control bus is one, thereby greatly reducing the load of the interface buffer circuit and hence facilitating apparatus design. The number of interface buffer circuits can be reduced, and each interface buffer circuit, a corresponding interstage buffer circuit, and a corresponding CPU buffer circuit are connected in series with each other to constitute a hierarchical structure. The pattern length is reduced and pattern design is facilitated. Since the pattern length is reduced, a highly reliable microprocessor system free from system noise can be arranged.

DESCRIPTION OF THE PREFERRED EMBODIMENT

A preferred embodiment of the present invention will be described with reference to FIG. 1.

Figure 1:
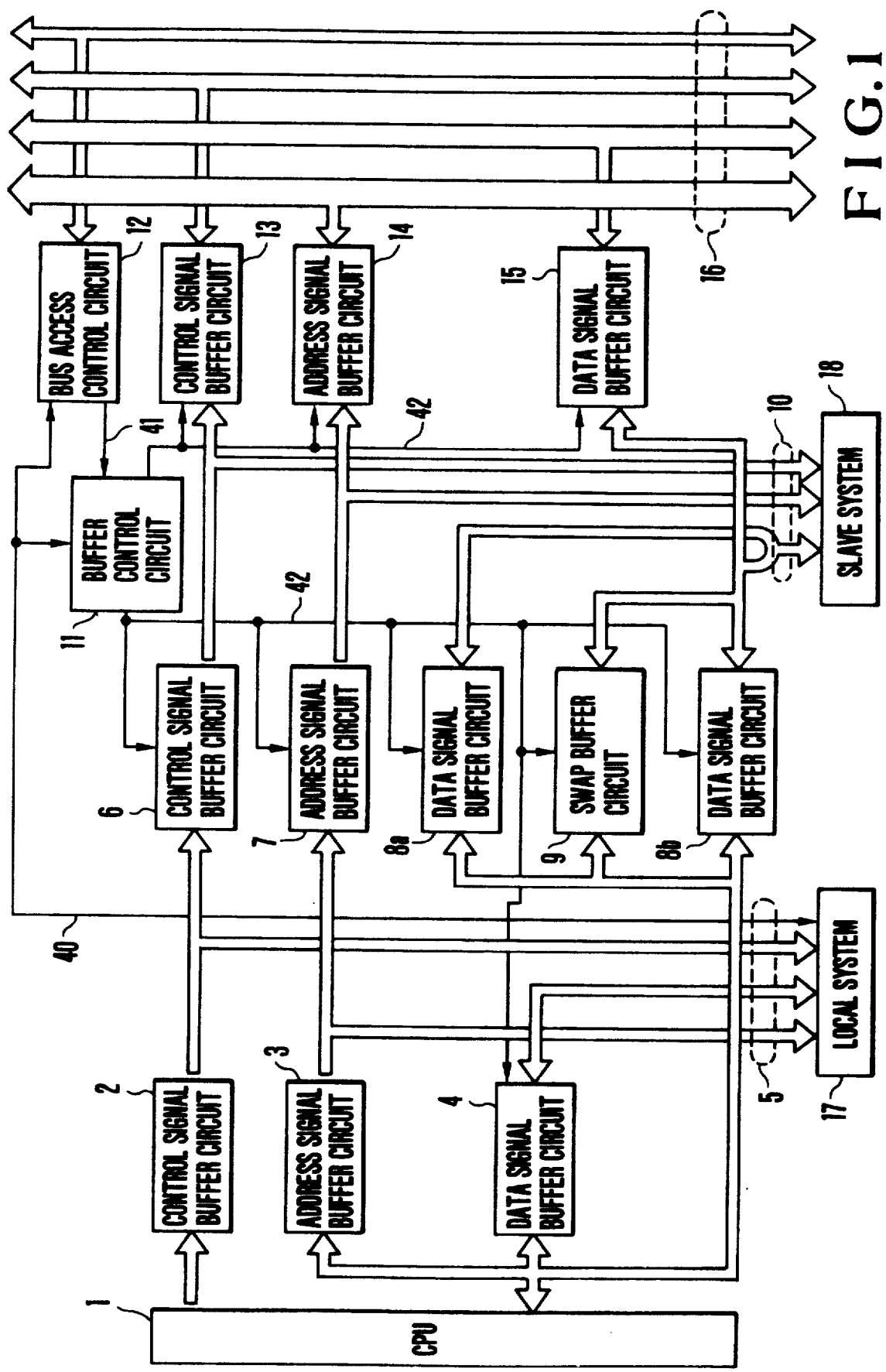
FIG. 1 is a block diagram of a microprocessor system according to an embodiment of the present invention.

FIG. 1 shows a microprocessor system according to the embodiment of the present invention. Referring to FIG. 1, a control signal buffer circuit 2 is connected to a control signal output bus of a CPU 1. An address signal buffer circuit 3 and a data signal buffer circuit 4 are connected to address and data signal input/output buses of the CPU 1. Data signal buffer circuits 8a and 8b and a swap buffer circuit 9 which serve as interstage buffer circuits are connected in parallel with the input/output buses. The control signal buffer circuit 2 and the address signal buffer circuit 3 are unidirectional buffer circuits, and output buses thereof are connected to a local system 17 and to the control signal buffer circuit 6 and the address signal buffer circuit 7 as the interstage buffer circuits, respectively. The data signal buffer circuit 4 is a bidirectional buffer circuit and is connected to the local system 17 through the data bus. The control signal buffer circuit 6 and the address signal buffer circuit 7 are unidirectional buffer circuits. The data signal buffer circuits 8a and 8b and the swap buffer circuit 9 are bidirectional buffer circuits. The buses connected to the local system 17 are called local system buses 5.

Of multi-system buses 16, a bus access control signal bus is connected to a bus access control circuit 12; a control signal bus is connected to a control signal buffer circuit 13; the address bus is connected to an address signal buffer circuit 14; and the data bus is connected to a data signal control circuit 15 serving as an interface buffer circuit. These interface buffer circuits are bidirectional buffer circuits.

The slave system 18 is connected to a bus for connecting the control signal buffer circuit 6 and the control signal buffer circuit 13, a bus for connecting the address signal buffer circuit 7 and the address signal buffer circuit 14, and a bus for connecting the data signal buffer circuits 8a and 8b and the swap buffer circuit 9 to the data signal buffer circuit 15 (these buses are called slave system buses 10).

Figure 4:
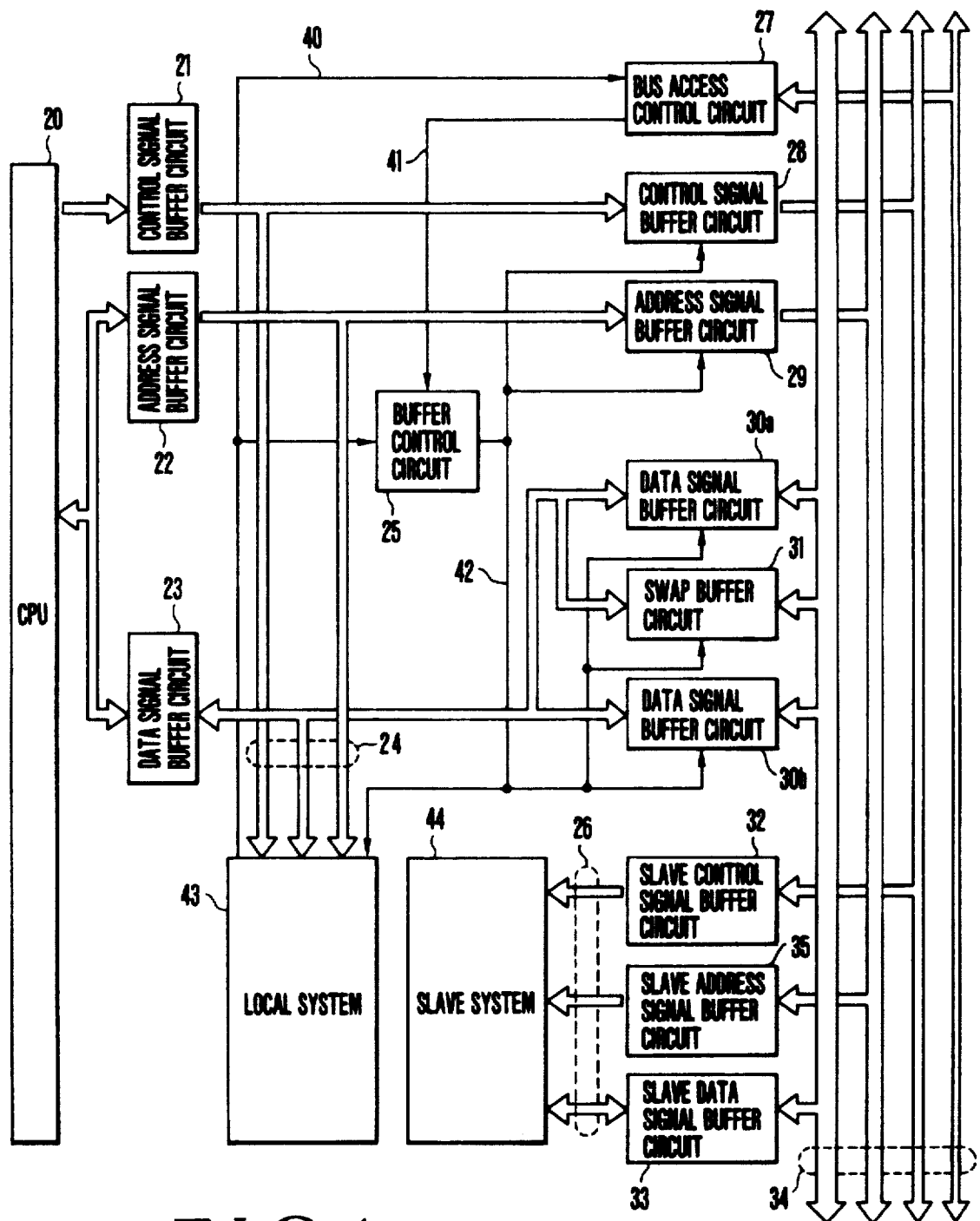
FIG. 4 is a block diagram of a conventional microprocessor system.

Other arrangements in FIG. 1 are the same as those in FIG. 4. The local system outputs a multi-system bus access request signal 40 to the bus access control circuit 12 and the buffer control circuit 11. A multi-system bus access enable signal 41 is output from the bus access control circuit 12 to the buffer control circuit 11. A buffer control signal 42 is output from the buffer control circuit 11 to a corresponding buffer circuit (4, 6, 7, 8a, 8b, 9, 13, 14, and 15).

An operation of the microprocessor system having the above arrangement will be described below. In the slave mode, the buffer control circuit 11 which receives a command from the bus access control circuit 12 inhibits operations of the interstage buffer circuits (6, 7, 8a, 9, and 8b) and at the same time performs direction control of the interface buffer circuits (13, 14, and 15). As a result, the system is divided into a CPU (1) side and a multi-system bus (16) side with respect to the interstage buffer circuits. The slave system 18 is connected to the multi-system buses 16 through the interface buffer circuits (13, 14, 15). That is, the slave system 18 receives data transferred from a given system connected to the multi-system buses 16.

In the master mode, the local system 17 generates the multi-system bus access request signal 40 on the basis of a command from the CPU 1 and outputs it to the buffer control circuit 11 and the bus access control circuit 12.

The bus access control circuit 12 determines whether another microprocessor system requests access of the multi-system buses 16. If a plurality of systems generate bus access requests, a priority discriminator discriminates a priority in accordance with a predetermined bus access order. If a bus access right is obtained, the bus access control circuit 12 outputs the multi-system bus access enable signal 41 to the buffer control circuit 11 to enable the interstage buffer circuits (6, 7, 8a, 9, and 8b).

The transfer direction of the bidirectional interface buffer circuits (13, 14, and 15) is controlled to be directed toward the multi-system buses 16. Since the interstage buffer circuits (8a, 9, and 8b) are bidirectional, the CPU 1 can exchange data with another system through the multi-system buses 16.

Figure 2:
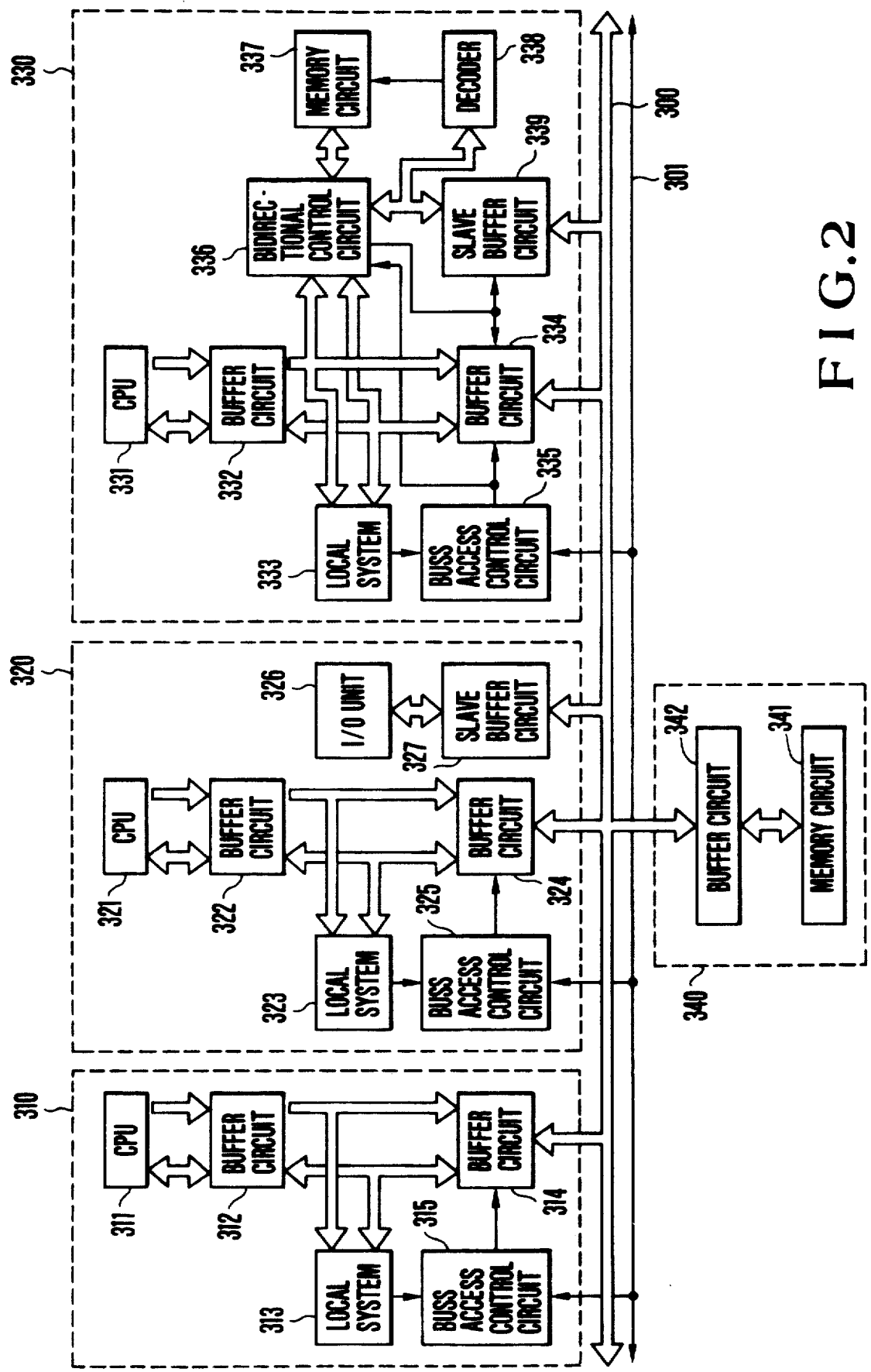
FIG. 2 is a block diagram of a multi-system consisting of a plurality of microprocessor systems and a slave system.
Figure 3:
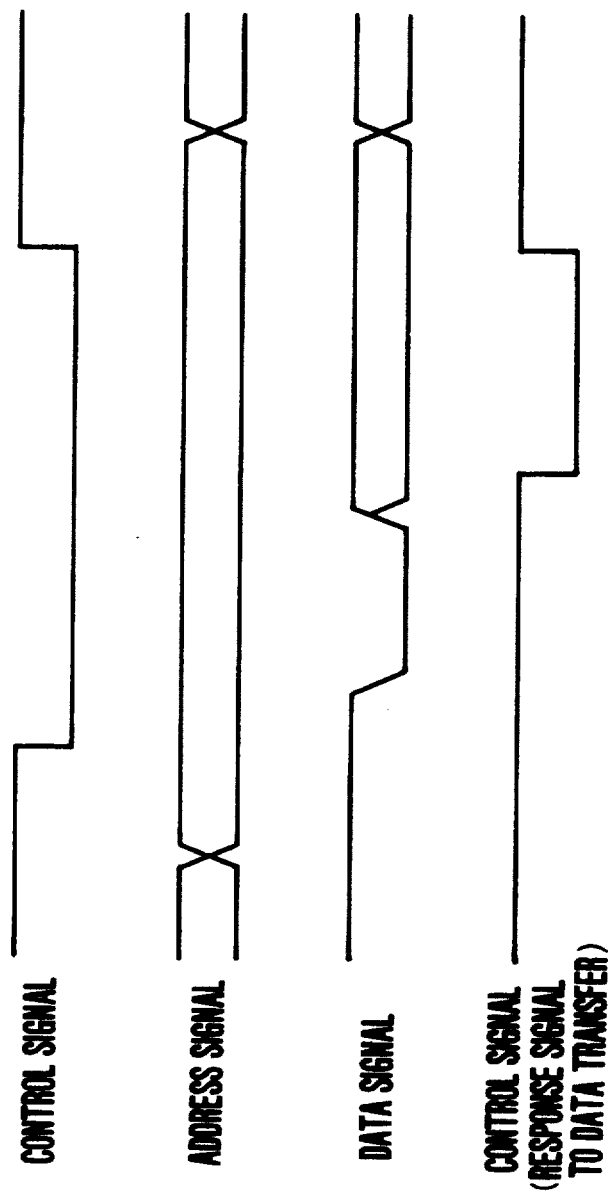
FIG. 3 is a timing chart showing the multi-system shown in FIG. 3.

As can be easily understood from the circuit arrangement, the slave system 18 can be directly controlled by the interstage buffer circuits (6, 7, 8a, 9, and 8b). That is, depending upon the arrangement of the buffer control circuit 11, the slave system 18 serves as that in the microprocessor system 320 or 330 in FIG. 2.

It should be noted that the buffer circuits are connected in series with each other in three stages, and the swap buffer circuit and the data signal buffer circuits associated with the swap buffer circuit are arranged as interstage circuits to simplify an interface on the multi-system bus (16) side. Therefore, the load on the interface buffer circuit can be greatly decreased, and limitations of the pattern lengths can be greatly moderated, thus facilitating apparatus design and wiring pattern design. Since the pattern length can be reduced, anti-noise characteristics of the system can be improved.

In this embodiment, it should also be noted that the interstage buffer circuits (8a, 9, and 8b) are directly connected to the input/output buses of the CPU 1. In principle, the interstage buffer circuits (8a, 9, and 8b) may be connected to the data bus for connecting the local system 17 and the data signal buffer circuit 4.

The above arrangement, however, poses a problem of signal delay. In addition, the local system 17 is connected in parallel with the interstage buffer circuits, and control is undesirably complicated. In summary, the above embodiment provides an arrangement for allowing high-speed processing by preventing signal delay and for improving controllability.

According to the microprocessor system of the present invention, as has been described in detail, each interface buffer circuit is connected to one type of bus of the multi-system. The load on the interface buffer circuits can be greatly reduced, and apparatus design can be facilitated. In addition, the number of interface buffer circuits can be reduced. Each interface buffer circuit, the corresponding interstage buffer circuit, and the corresponding CPU buffer circuit are connected in series with each other to constitute a hierarchical structure. Therefore, the pattern length can be reduced to facilitate pattern design. As the pattern length can be reduced, a highly reliable microprocessor system free from system noise can be arranged.

What is claimed is:

1. A microprocessor system connected in parallel with a given microprocessor system to multi-system buses, comprising:

a slave system, directly controlled by a central processing unit, controlled by said given microprocessor system through said multi-system buses or controlled by said central processing unit and said given microprocessor system, for performing a subordinate operation;

a bidirectional interface control signal buffer circuit, a bidirectional interface address signal buffer circuit, and a bidirectional interface data signal buffer circuit which are respectively connected to a control signal bus, an address bus, and a data bus of said multi-system buses;

a CPU control signal buffer circuit connected to a CPU control signal output bus, a CPU address signal buffer circuit connected to a CPU address signal input/output bus, and a CPU data signal buffer circuit connected to a CPU data signal input/output bus; and a unidirectional interstage control signal buffer circuit connected midway along a bus arranged between said CPU control signal buffer circuit and said bidirectional interface control signal buffer circuit, for connecting said CPU control signal buffer circuit to said bidirectional interface control signal buffer circuit or disconnecting said CPU control signal buffer circuit from said bidirectional interface control signal buffer circuit, a unidirectional interstage address signal buffer circuit, arranged midway along a bus arranged between said CPU address signal buffer circuit and said bidirectional interface address signal buffer circuit, for connecting said CPU address signal buffer circuit to said bidirectional interface address signal buffer circuit or disconnecting said CPU address signal buffer circuit from said bidirectional interface address signal buffer circuit, and a bidirectional interstage buffer circuit, arrange midway along a bus arranged between said bidirectional interface data signal buffer circuit and one of said CPU data signal input/output bus and said CPU data signal buffer circuit, for connecting said one of said CPU data signal input/output bus and said CPU data signal buffer circuit to said bidirectional interface data signal buffer circuit or disconnecting said one of said CPU data signal input/output bus and said CPU data signal buffer circuit from said bidirectional interface data signal buffer circuit, said bidirectional interstage buffer circuits including data signal buffer circuits and a swap buffer circuit, connected in parallel with said data signal buffer circuits, for performing bit width conversion;

said slave system being connected to a bus for connecting said bidirectional interstage control signal buffer circuit and said bidirectional interface control signal buffer circuit, a bus for connecting said unidirectional interstage address signal buffer circuit and said bidirectional interface address signal buffer circuit, and a bus for connecting said bidirectional interstage buffer circuits and said bidirectional interface data signal buffer circuit.

* * * * *